US006827889B2

(12) United States Patent
Hinzpeter et al.

(10) Patent No.: US 6,827,889 B2
(45) Date of Patent: Dec. 7, 2004

(54) PROCESS FOR COMPACTING POWDERED MATERIAL

(75) Inventors: Jürgen Hinzpeter, Schwarzenbek (DE); Ulrich Zeuschner, Schwarzenbek (DE); Ingo Schmidt, Schwarzenbek (DE); Thomas Pannewitz, Schwarzenbek (DE); Udo Baltruschat, Hamburg (DE); Thorsten Ehrich, Hamburg (DE)

(73) Assignee: Fette GmbH, Schwarzenbek (DE)

( * ) Notice: Subject to any disclaimer, the term of this patent is extended or adjusted under 35 U.S.C. 154(b) by 103 days.

(21) Appl. No.: 10/194,581

(22) Filed: Jul. 13, 2002

(65) Prior Publication Data

US 2003/0024418 A1 Feb. 6, 2003

(51) Int. Cl.[7] .......................................... B29C 43/02

(52) U.S. Cl. ..................... 264/40.5; 425/149; 425/150; 419/66

(58) Field of Search ......................... 264/40.5; 425/149, 425/150; 419/66

(56) References Cited

U.S. PATENT DOCUMENTS

| | | | | |
|---|---|---|---|---|
| 4,680,158 A | * | 7/1987 | Hinzpeter et al. | 264/40.5 |
| 5,004,576 A | * | 4/1991 | Hinzpeter et al. | 264/40.5 |
| 5,043,111 A | | 8/1991 | Hinzmann et al. | 264/40.5 |
| 5,211,964 A | * | 5/1993 | Prytherch et al. | 425/140 |
| 6,074,584 A | | 6/2000 | Hinzpeter et al. | 264/40.5 |
| 6,442,859 B1 | | 9/2002 | Hinzpeter et al. | 33/645 |
| 6,562,291 B2 | * | 5/2003 | Hinzpeter et al. | 419/66 |

FOREIGN PATENT DOCUMENTS

| | | |
|---|---|---|
| WO | WO 00/20192 | 4/2000 |

* cited by examiner

*Primary Examiner*—Mary Lynn Theisen
(74) *Attorney, Agent, or Firm*—Vidas, Arrett & Steinkraus PA

(57) ABSTRACT

A process for compacting powdered material to form a compact of a predetermined thickness and having at least one lateral oblique surface by means of a bore in a die bolster for receiving the powdered material and an upper ram and a lower ram, which are operable by means of a hydraulic power-exerting device and are positionable by means of a control device with respect to the die bolster, comprising the following steps:

Figure 1:
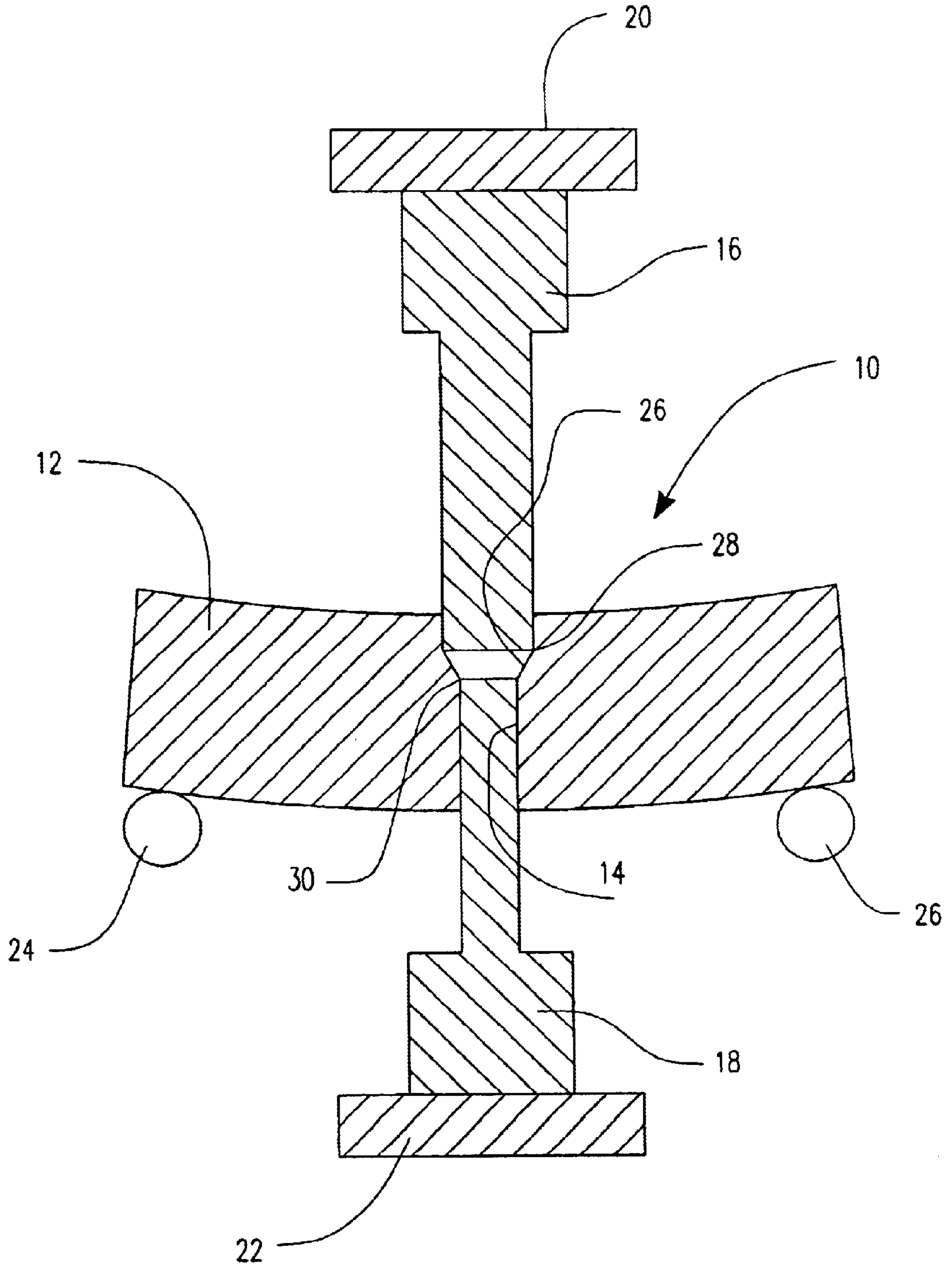

The deformations of the die bolster are measured or calculated for various compacting forces and the correlating values are filed as a table in a memory with the deformations forces being determined from the difference of the compacting forces of the two rams, and Deformation is determined during the compaction procedure by applying the deformation force measured to the table and the feed length of the upper and lower rams is corrected depending on deformation.

3 Claims, 2 Drawing Sheets

PROCESS FOR COMPACTING POWDERED MATERIAL

A common technique for compacting powdered material consists in forming the mould space in a so-called die bolster and in producing the compact by means of an upper ram and a lower ram. Usually, the lower ram is moved into the die bore up to a predetermined position, whereupon filling is effected with powdered material. Subsequently, the compact is formed with the aid of the upper ram. Such a technique is used, for instance, to compact metallic powder for the manufacture of molded components according to the sintering process. This aims at molding the compact in a relatively precise way already, if possible, with a view to its geometrical dimensions and its density so as to achieve the desired dimensional accuracy later after the sintering process.

If the compact has a geometrical shape in which an oblique surface is provided at the outside as is the case, for instance, in cutting blades for milling and drilling tools a very significant deformation force is applied to the die bolster during the compaction procedure. The deformation force causes the die bolster to get deformed by flexing and upsetting. The flexing effect thus caused on the bolster may be reduced by a skilful selection of the supporting surfaces and the die bolster cross-sections, but cannot be eliminated.

In the compaction process described, the deformation of the die bolster may not be ignored. It is necessary for the upper ram to travel to and stop at the edge at the transition point of the mould surfaces in a precise manner. If the upper ram is not stopped at this point the ram and die bolster will be damaged. On the contrary, there will be a lack of dimensional accuracy if the ram is stopped too early.

It is known to determine by tests or calculations by which amount a die bolster undergoes deformation in a certain compaction procedure to predetermine the displacement length of the upper ram. This is normally accomplished by ascertaining on the compact whether or not the compaction ram has traveled through the predetermined distance. Such a technique involves relatively great expenditure and does not protect the compaction device from damage. If relatively low compacting forces occur because material was insufficiently filled in there will be no de-formation of the die bolster or it achieves distinctly smaller values so that if the compaction ram is positioned the upper ram will strike against the edge of the bolster bore, as a consequence.

It is the object of the invention to provide a process for compacting powdered material by which a compact may be manufactured in a reproducibly precise manner while protecting the compaction device against unintended damage caused by insufficient die bolster deformation.

The invention relies on the fact that the flexing force acting on the die bolster results from the difference of the compacting forces applied by the upper and lower rams. In the inventive process, a curve or table is obtained to report the dependence of die bolster deformation from the compacting forces applied. Furthermore, to adjust the feed paths of the compaction, it is essential to know which displacements of the die bore occur if deformations differ. Therefore, in the inventive process, the compacting forces are measured from time to time or even continuously during the compaction process to determine the respective deformation. A certain deformation rate of the die bolster also includes a predetermined feed path for the compaction rams. Therefore, it is possible to correct the length of the feed length by means of the inventive process during the compaction procedure depending on the results of the measurements described. Therefore, an outcome of the invention is that the upper ram is precisely moved up to the edge of the die bore without touching it significantly, however.

When the die bolster is deformed a relative displacement of the lower ram and the die bore will also occur naturally. Hence, it is necessary to correct the feed length of the lower ram concurrently with the correction described for the feed length of the upper ram.

The inventive process allows to prevent the upper ram from striking against an edge of the die bore if no deformation occurs to the die bolster. Since the compacting force is consistently measured as was mentioned, but can also fall below certain values this way permits to determine the time the entire compaction device needs to be stopped to avoid damage to both the upper ram and die bore.

In the compaction process described, not only does the die bolster undergo deformation, but the upper and lower rams also undergo an upsetting deformation. The deformation rates are relatively small as is the deformation of the die bolster, but are not negligible. Thus, for instance, a deformation of some $\mu$m per tonne of compacting force is obtained in a die bolster. To enable a correction also in the event of a non-negligible upsetting of the compaction rams, an aspect of the invention provides that the upsetting deformation of the rams are measured or calculated for various compacting forces thereon. The correlating values of the upsetting deformation and compacting forces are filed as a table in a memory. Then, the feed rate of the upper and lower rams will be corrected depending on the extent of upsetting.

An embodiment of the invention will be explained in more detail below with reference to the drawings.

FIG. 1 schematically shows a compaction device according to the invention.

Figure 2:
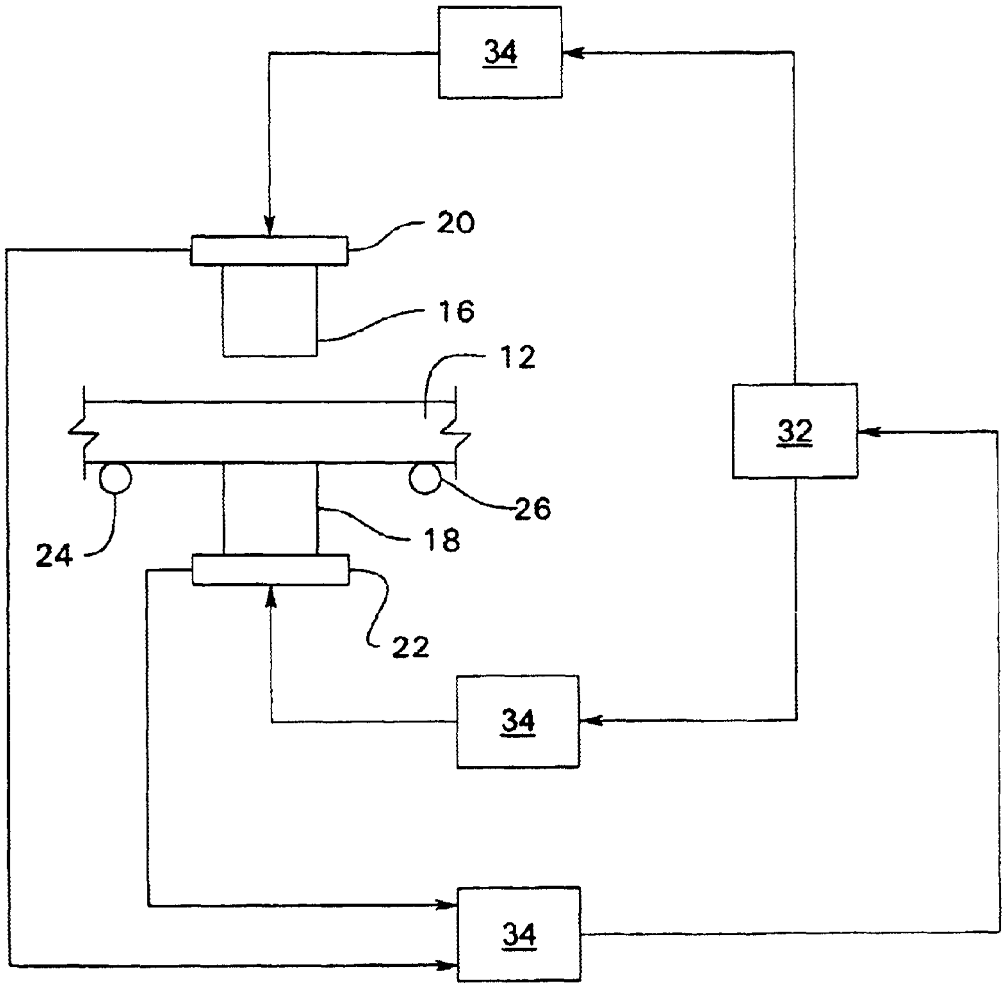

FIG. 2 shows the operation of the compaction device of FIG. 1 with reference to a block diagram.

A compaction device 10 illustrated in FIG. 1 has a die bolster 12 with a die bore 14 with which an upper ram 16 and a lower ram 18 cooperate. The power-exerting devices which actuate the rams 16, 18 are not shown. They are conventional and act hydraulically, for instance. Such compaction devices make it possible to position the compaction rams in the $\mu$m range. The power-exerting devices and rams 16, 18 have interposed therebetween a load cell 20 and 22, respectively. The die bolster 12 rests on spaced supports 24, 26.

As can be recognized the mould space proper of the die bolster 12 is conical or trapezoidal in cross section and has two oblique surfaced 29. Naturally, there is only one conical surface if a circular mold space exists. The mould space, which can be seen in FIG. 1, serves for the manufacture of a compact from powered metallic material, for instance, from which a reversible cutting blade is manufactured according to the sintering process, e.g. for use in milling or drilling tools or the like. Both of the compaction rams 16, 18 move into the bore 14 with the upper compression ram requiring to travel up to the edge 28, thus predetermining the position of the compact upper side whereas the lower ram requires to travel up to the edge 30 to predetermine the thickness of the compact. During the compaction procedure, the lower ram 18 is initially advanced up to a filling position. Subsequently, filling is effected with powered material. The upper ram 16 is actuated afterwards and is moved up to the edge 28 to deform the compact by compaction. The lower ram 18 is moved up to the edge 30 at the same time.

Since the cross-sections of the upper and lower rams 16, 18 are different for compaction a pressure differential is applied to the die bolster 12 and the die bolster is flexed and upset between the supports 24, 26 as can be clearly seen in an exaggeration in FIG. 1. Such deformation of the die bolster 12 now makes it necessary for the upper ram 16 to be moved farther into the die bore 14 than if the die bolster 12 is not deformed, with a view to getting to the edge 28. This displacement length is dependent upon the deformation of the die bolster 12 which, in turn, is dependent on the differential force on the die bolster.

The way the compaction device 10 of FIG. 1 operates clearly ensues from the block diagram of FIG. 2. A computer 38 has filed therein a table reporting the way of action between the deformation force on the die bolster 12 and the deformation resulting therefrom. More specifically, it has filed therein the displacement of the die bore or edge 28 relative to the deformation force. This relationship may be determined by means of appropriate measurements or calculations before production begins. The powdered material requiring compaction is known and so is the density required for the compact. Thus, deformation can be determined for the individual deformation forces which are formed from the difference of the compacting forces of rams 16, 18.

During the compaction procedure, the compacting forces acting on the compacting rams 16, 18 are measured continuously or intermittently by means of the load cells 20, 22 and the deformation force is calculated therefrom. The associated deformation of the die bolster 12 or the displacement of the edge 28 of the die bolster 12 is determined in the computer 38. The computer 38 therefrom transmits the feed length of the compacting ram 16 and provides a control device 32 with an appropriate positioning signal for the power-exerting members 34 and 36 for the compacting rams 16, 18. This way allows to make the upper ram 16 travel precisely to the edge 28 and the lower ram 18 precisely to the edge 30 regardless of the deformation that the die bolster 12 undergoes. This is because if the die bolster 12 is deformed there is also a relative displacement of the lower ram 16 and the die bolster 12 and the lower ram 18 needs to be appropriately positioned by the power-exerting member 36 to make it remain at the edge 30.

If too low a value appears while compacting forces are measured the computer 38 generates a turn-off signal for the compacting device 10. This avoids damage to the rams and die bolster.

What is claimed is:

1. An improvement to a process for compacting powdered material to form a compact of a predetermined thickness and having at least one lateral oblique surface by means of a bore in a die bolster for receiving the powdered material and an upper ram and a lower ram, which are operable by means of a hydraulic power-exerting device and are positionable by means of a control device with respect to the die bolster, the improved process including the following steps:

the deformations of the die bolster are measured or calculated for various compacting forces and the correlating values are filed as a table in a memory with the deformation forces being determined from the difference of the compacting forces of the two rams, and deformation is determined during the compaction procedure by applying the deformation force measured to the table and the feed length of the upper and lower rams is corrected depending on deformation.

2. The process as claimed in claim 1, characterized in that the deformation force is continuously determined during the compaction procedure.

3. The process of claim 1, characterized in that the power-exerting device is turned off when the compacting forces or deformation force are below predetermined values.

* * * * *